United States Patent Office 3,058,827
Patented Oct. 16, 1962

3,058,827
DIALDEHYDE STARCH AS GELATIN HARDENER
James L. Graham, Rochester, N.Y., assignor to Eastman Kodak Company, Rochester, N.Y., a corporation of New Jersey
No Drawing. Filed Feb. 9, 1960, Ser. No. 7,522
2 Claims. (Cl. 96—111)

This invention relates to improvement in the solubility of oxystarch which is employed for the hardening of gelatin coatings, particularly gelatin silver halide emulsions.

In Jeffreys and Tabor application Ser. No. 822,444, filed June 24, 1959, the problem of satisfactorily hardening the gelatin of photographic gelatin-silver halide emulsions without causing deterioration of the properties of the silver halide is discussed. In that application there were described and claimed as hardeners for that purpose, oxy starch or dialdehyde starch prepared by the oxidation of starch using periodic acid or a periodate such as sodium periodate. The formula of oxystarch or dialdehyde starch may be represented as follows:

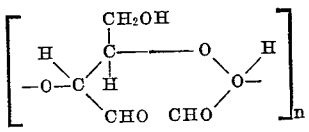

One drawback to the use of dialdehyde starch as a hardener in aqueous gelatin coating compositions is its limited water solubility even upon prolonged boiling.

One object of my invention is to treat dialdehyde starch to improve its water solubility and thus improve its value for use as a hardening agent in gelatin compositions. Another object of my invention is to provide gelatin coating compositions containing that solubilized oxystarch. A still further object of my invention is to provide a simple process for improving the water solubility of oxystarch which involves the treatment of the oxystarch with dilute aqueous alkali for a time. Other objects of my invention will appear herein.

I have found that the treatment of oxystarch or dialdehyde starch with dilute aqueous alkali at room temperature for a time makes the dialdehyde starch readily soluble in warm water without impairing its hardening properties when used in gelatin coating compositions.

Oxystarch such as is useful for hardening gelatin is prepared by oxidation of starch with a water soluble periodate or periodic acid whereby aldehyde groups are imparted thereto. One method which has been disclosed for preparing oxystarch is that of Grangaard, Mitchell, and Purves, J. Amer. Chem. Soc., 1939, 61, 1290. By that procedure starch is preswollen in boiling water and then oxidized with sodium metaperiodate. As a result of that action secondary alcohol groups of the starch are oxidized to aldehyde groups, preferably to a point that at least 30% of the secondary alcohol groups of the starch are so oxidized. The most powerful hardeners of this type are those which result from oxidation of 80–100% of the secondary alcohol groups to aldehyde groups. This material, however, is limited in its water solubility.

I have found that by treating dialdehyde starch with dilute alkali at room temperatures the dialdehyde starch is rendered more readily soluble in water, particularly warm water, and the hardening properties thereof are not impaired. It is believed that by this treatment a small percentage of the aldehyde group in the dialdehyde starch are converted to the acid form by a Cannizarro reaction, thus imparting improvement in water solubility thereto under conditions at which no serious decomposition occurs. The dialdehyde starch is subjected to treatment with dilute alkali such as by shaking the dialdehyde starch in dilute aqueous sodium hydroxide having a concentration of from 0.01 N to 0.1 N with treatment times of one hour or less. Thus, the treatment of oxystarch for 1 hour with 0.015 N sodium hydroxide has been found satisfactory, while if stronger sodium hydroxide solutions such as 0.1 N is used solubility may be obtained in a shorter time.

For example, to 0.5 grams of dialdehyde starch was added 47 cc. of water and 3 cc. of a 1% solution of sodium hydroxide making the treating liquid 0.025 N. The mixture was stirred until the oxystarch had dissolved to give a perfectly clear low viscosity liquid. The pH of the solution was about 6.9. An attempt to dissolve the oxystarch in water without the sodium hydroxide treatment gives a clear solution on stirring at a temperature of 200° F., but as the temperature is reduced the oxystarch precipitates out as a granular deposit. Thus, although oxidized starch may be incorporated in gelatin solution by adding a hot solution thereof to a gelatin solution for addition to a photographic emulsion just prior to coating, the treatment described herein provides an oxidized starch which may be incorporated in gelatin coating compositions without the use of temperatures so elevated that they may cause decomposition of the oxystarch.

The material thus prepared is adapted for use for hardening gelatin coatings per se or photographic emulsions for either black-and-white or color photography. For instance the hardener may be added to a gelatin-silver halide color emulsion containing a cyan forming coupler dispersion therein. The emulsion thus prepared when coated on cellulose acetate support and over-coated with a gelatin layer having the same concentration of hardener as used in the emulsion gives a product having good reistance to water at elevated temperatures.

The degree of hardness obtained with these solubilized oxystarch hardeners has been determined by incorporating them in gelatin-silver halide color emulsions containing magenta forming couplers and a dioctylhydroquinone antistain agent. To determine the hardness, the melting point of a coating of the emulsion was determined in a 2% sodium carbonate solution starting at 104° F., the temperature being increased in increments of 9° F. About 30 seconds was used to accomplish the increase and the temperature was then held constant for 2 minutes before the next 30-second period of increase. The films tested were those in which the emulsion had been applied as a layer to cellulose acetate film base and the coatings thereon were incubated for 7 days at 120° F. and 50% relative humidity. The results were as follows:

| No. | Hardener | Concentration | Emulsion Melting Point (° F.) |
|---|---|---|---|
| 1 | Treated oxystarch | 2% of the gel | >194° hard. |
| 2 | Treated oxystarch | 4% of the gel | >194° hard. |
| 3 | None | | 104°. |

194° F. was the highest temperature to which the aqueous sodium carbonate was heated. At that temperature no softening of the emulsion layer containing the treated oxystarch was apparent.

In another example, 10 grams of dialdehyde starch having an aldehyde content 90% of the theoretical maximum was shaken for 1 hour at room temperature with 100 ml. of 0.025 N sodium hydroxide solution. The aldehyde content of the product was reduced about 5% by this treatment. A 1% solution of this solubilized dialdehyde starch was easily prepared by mixing with water and warming. If untreated dialdehyde starch were employed, 30 minutes boiling in water under reflux would be required to effect solution. Solutions of treated and untreated oxystarch were added to separate gelatin solutions which were coated and dried down to form layers on film base. The melting points of the gelatin layers determined by heating in the presence of water were determined, the results being as follows:

| Hardener | M.P. of layer (° C.) |
|---|---|
| None | 33 |
| Untreated oxystarch (0.0033 gram/gram of gelatin) | 56 |
| Treated oxystarch (0.0033 gram/gram of gelatin) | 62 |

When the treated oxystarch was employed in sensitized photographic gelatino-silver halide emulsion layers no undesirable side effects were detected. The treated dialdehyde starch hardener of my invention can be used in conjunction with the usual emulsion additives such as anti-foggants, chemical sensitizers, coating aids, etc.

I claim:
1. Gelatin containing as a hardener therein a dialdehyde starch which had been treated with alkali metal hydroxide at a pH no more than 7.
2. A gelatin-silver halide photographic emulsion containing as the hardener therein a dialdehyde starch which has been treated with alkali metal hydroxide at a pH no more than 7.

References Cited in the file of this patent
UNITED STATES PATENTS

| | | |
|---|---|---|
| 1,870,354 | Brunken | Aug. 9, 1932 |
| 2,172,300 | Staud et al. | Sept. 5, 1939 |
| 2,606,188 | Yelland | Aug. 5, 1952 |
| 2,783,283 | Sloan | Feb. 26, 1957 |
| 2,880,236 | Mehltretter et al. | Mar. 31, 1959 |
| 2,894,945 | Hofreiter et al. | July 14, 1959 |
| 2,929,811 | Hofreiter et al. | Mar. 22, 1960 |